(12) United States Patent
Nakanishi

(10) Patent No.: US 6,907,513 B2
(45) Date of Patent: Jun. 14, 2005

(54) MATRIX PROCESSING METHOD OF SHARED-MEMORY SCALAR PARALLEL-PROCESSING COMPUTER AND RECORDING MEDIUM

(75) Inventor: Makoto Nakanishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 674 days.

(21) Appl. No.: 09/811,484

(22) Filed: Mar. 20, 2001

(65) Prior Publication Data

US 2002/0091909 A1 Jul. 11, 2002

(30) Foreign Application Priority Data

Nov. 24, 2000 (JP) ......................... 2000-358232

(51) Int. Cl.⁷ ............................. G06F 9/38; G06F 9/302
(52) U.S. Cl. ........................................ 712/17; 708/520
(58) Field of Search ........................... 712/17; 708/520, 708/514

(56) References Cited

U.S. PATENT DOCUMENTS

| | | | | |
|---|---|---|---|---|
| 5,157,778 A | * | 10/1992 | Bischoff et al. | 703/14 |
| 5,490,278 A | * | 2/1996 | Mochizuki | 708/446 |
| 5,604,911 A | * | 2/1997 | Ushiro | 703/2 |
| 5,644,517 A | * | 7/1997 | Ho | 708/401 |
| 6,144,932 A | * | 11/2000 | Hachiya | 703/14 |
| 6,182,270 B1 | * | 1/2001 | Feldmann et al. | 716/5 |
| 6,360,190 B1 | * | 3/2002 | Kumashiro | 703/2 |

FOREIGN PATENT DOCUMENTS

JP  8-227405  9/1995

OTHER PUBLICATIONS

Communication from Japanese Patent Office dated Mar. 30, 2004.

* cited by examiner

Primary Examiner—William M. Treat
(74) Attorney, Agent, or Firm—Staas & Halsey LLP

(57) ABSTRACT

In accordance with a parallel matrix processing method adopted in a shared-memory scalar computer, a matrix to be subjected to LU factorization is divided into a block D of the diagonal portion and blocks beneath the D diagonal block such as L1, L2 and L3. Then, D+L1, D+L2 and D+L3 are assigned to 3 processors respectively for processing them in parallel. Next, a block U is updated by adopting an LU-factorization method and C1 to C3 are updated with L1 to L3 and U. By carrying out this processing on the inner side gradually decreasing in size as blocks, finally, a portion corresponding to the D diagonal block remains to be processed. By applying the LU factorization to this D portion, the LU factorization for the entire matrix can be completed.

8 Claims, 16 Drawing Sheets

```
DO i=1, iblks
  TMP=0.0 DO;jj=0
  DO j=i, leng
    IF(ABS LT(j, i)), GT , TMP)THEN
    TMP=ABS(LT(j, i))
    jj=j
    ENDIF
  ENDDO                                    ⎤
                                           ⎬ (1)
                                           ⎦

IF(jj, GT, i)  THEN                      ⎤
    DO k=1, iblks                          │
      TMPX=LT(i, k)                        │
      LT(i, k)=LT(jj, k)                   ⎬ (2)
      LT(jj, k)=TMPX                       │
    ENDDO                                  │
  END IF                                   ⎦

DO k=i+1, iblks
    LT(i, k)=LT(i, k)/LT(i, i)
  ENDDO                                    ⎤
                                           │
  DO k=i+1, iblks                          │
    DO l=i+1, leng                         ⎬ (3)
      LT(l, k)=LT(l, k)−LT(l, i)×LT(i, k)  │
    ENDDO                                  │
  ENDDO                                    │
                                           │
ENDDO                                      ⎦
```

|  |  |  |  |  |  |
|---|---|---|---|---|---|
| 256 | D1 | U1 | U2 | U3 | U4 |
| 384 | L1 | C1 ||||
| 384 | L2 | C2 ||||
| 384 | L3 | C3 ||||
| 384 | L4 | C4 ||||

FIG. 9

```
subroutine LU(LTi, k, iblks, ist, nwid)
    (WHERE LTi IS USED BY THREADS FOR STORING (D1+Li),
     k IS THE SIZE OF THE FIRST ONE DIMENSION OF LTi,
     iblks IS THE BLOCK WIDTH,
     ist IS A POSITION TO START THE Lu FACTORIZATION AND
     nwid IS THE WIDTH OF AN OBJECT SUBJECTED TO THE Lu FACTORIZATION)
    IF(nwid, eq, 8), Then(A WIDTH OF 8 IS A MINIMUM).

LTi(ist:k, ist, ist+nwid−1) IS SUBJECTED TO THE LU FACTORIZATION IN
    PARALLEL.
    ⎛  HERE, THE PARTS (4) TO (10) OF FIG.9 ARE EXECUTED.           ⎞
    ⎢  IN THIS CASE, THE ROW-TRANSPOSING UNIT TRANSPOSES            ⎥
    ⎝  LTi(i, 1, iblks) AT THE LENGTH iblk.                         ⎠
    else
        call LU(LTi, k, iblks, ist, nwid/2)
        call TRS( )
        UPDATE LTi(ist:ist+nwid/2−1, ist+nwid/2:ist+nwid). BY USING A
    LOWER-TRIANGULAR MATRIX LL OF LTi(ist:ist+nwid/2−1, ist:ist+nwid/2
    −1), UPDATE IT BY MULTIPLYING IT BY LL$^+$ FROM THE LEFT.

call MM( )
    ⎛  LTi(ist+nwid/2:k, ist+nwid/2:ist+nwid)                       ⎞
    ⎢  =LTi(ist+nwid/2:k, ist+nwid/2:ist+nwid)                      ⎥
    ⎢   −LTi(ist+nwid/2:k, ist:ist+nwid/2−1) ×                      ⎥
    ⎝    LTi(ist:ist+nwid/2−1, ist+nwid/2:ist+nwid)                 ⎠

Barrier SYNCHRONIZATION
    call LU(LTi, k, iblks, ist+nwid/2, nwid/2)
    end if
        return
        end subroutine
```

FIG. 10

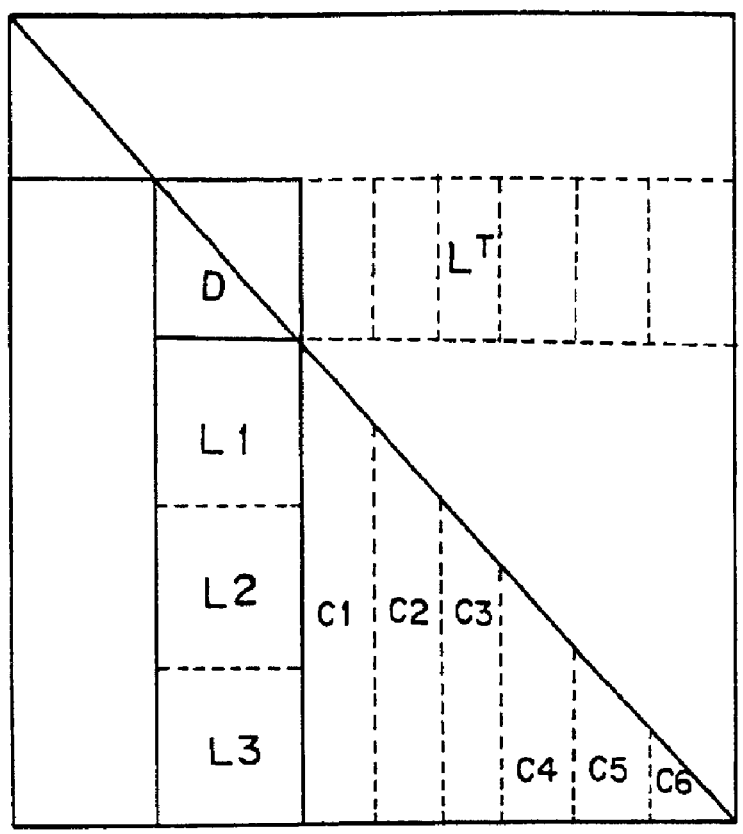
F I G. 11

```
subroutine LTD(LTi, k, iblks, ist, nwid)
  IF(nwid, EQ, 8)THEN    (THE WIDTH OF 8 IS THE MINIMUM)
    DO i=ist, ist+7
      DO j=i+1, ist+7
        LTi(i, j)=LTi(j, i)
        LTi(j, i)=LTi(j, i)/LTi(i, i)
      ENDDO
      DO jy=i+1, ist+7
      DO jx=jx, ist+7
        LTi(jx, jy)=LTi(jx, jy)-LTi(jx, i)×LTi(i, jy)
      ENDDO
    ENDDO
```
(20)

UPDATE LTi(LTi(ist+8:k, ist:ist+7).
SINCE DL$^T$ IS INCLUDED IN THE UPPER TRIANGLE OF
LTi(LTi(ist:ist+7, ist:ist+7), UPDATE (PL$^T$)$^{-1}$ FROM THE RIGHT.

ELSE
call LDL(LTi, k, iblks, ist, nwid/2)

COPY DL$^T$ TO
·LTi(ist:ist+nwid/2−1, ist+nwid/2:ist+nwid−1).
(D IS AN OBJECT ELEMENT OF LTi(ist:ist+nwid/2−1, ist:ist+nwid/2−1)
AND L IS
LTi(ist+nwid/2:ist+nwid−1, ist:ist+nwid/2−1),
TRANSPOSING THIS L$^T$.)

·UPDATE LTi(ist+nwid/2:k, ist+nwid/2:ist+nwid−1).

LTi(ist+nwid/2:k, ist+nwid/2:ist+nwid−1)
=LTi(ist:ist+nwid/2:k, ist+nwid/2:ist+nwid−1)−
LTi(ist+nwid/2:k, ist:ist+nwid−1)×
LTi(ist:ist+nwid/2−1, ist+nwid/2:ist+nwid−1)

CALL LDL (LTi, k, iblks, ist+nwid/2, nwid/2)

ENDIF

RETURN

END

FIG. 16

MATRIX PROCESSING METHOD OF SHARED-MEMORY SCALAR PARALLEL-PROCESSING COMPUTER AND RECORDING MEDIUM

BACKGROUND OF THE INVENTION

1. Field of the Invention

The present invention relates to a parallel matrix processing method adopted in a shared-memory scalar parallel-processing computer.

2. Description of the Related Art

There is provided a method of using a computer to find solutions to simultaneous linear equations whereby the equations are expressed in terms of matrixes which allow the solutions to be found by processing the matrixes. Thus, in accordance with this method, the solutions to the simultaneous linear equations are found after converting the equations into such a form that allows the solutions to be found with ease.

To put it in more detail, coefficients of the simultaneous linear equations are expressed in terms of a coefficient matrix and variables of the equations are expressed in terms of a variable matrix. The problem is to find such a variable matrix representing the variables that a product of the coefficient matrix and the variable matrix is equal to a predetermined column vector. In accordance with a technique called LU factorization, the coefficient matrix is factorized into an upper-triangular matrix and a lower-triangular matrix. The operation to factorize a coefficient matrix in accordance with the LU-factorization technique is an important step in finding solutions to simultaneous linear equations. A special version of the LU-factorization technique for factorizing a matrix is known as Cholesky factorization.

a) Technique for Solving Real-matrix Simultaneous Linear Equations

In accordance with a technique of solving simultaneous linear equations expressed in terms of a real matrix, the equations are solved by using a vector parallel-processing computer wherein parallel processing is based on blocked outer-product LU factorization. To put it concretely, this technique has the steps of:

1. Applying the LU factorization to a block which is a bunch of bundled column vectors;

2. Updating a block which is a bunch of bundled corresponding row vectors; and

3. Updating a rectangular small matrix.

The technique is implemented by executing the sequence of the steps repeatedly.

Conventionally, the processing of step 1 is carried out sequentially by using one processor. In order to improve a parallel processing efficiency, a block width is set at a relatively small value of about 12. A block width is a row width of a coefficient matrix. The row width of a coefficient matrix is the number of columns in the matrix. A block width can also be a column width of a coefficient matrix. The column width of a coefficient matrix is the number of rows in the matrix. Thus, the pieces of processing carried out at steps 2 and 3 are each processing to update a matrix with a width of about 12.

The most costly computation is the processing of step 3. There is an efficient technique for this processing of a matrix with a small width of about 12. A shared-memory scalar parallel-processing (SMP) computer is not capable of displaying the most of its performance when processing a matrix with a small width for the following reason.

The processing of step 3 is an operation to find a product of matrixes. In this case, elements of a matrix with a small width are loaded from a memory and updating results are stored back into the memory. The cost incurred in making accesses to the memory is high in comparison with the processing to update the matrix so that the most of the performance cannot be displayed.

For the reason, it is necessary to increase the block size. If the block size is increased, however, the cost of the LU factorization of the block also rises so that the efficiency of the parallel processing decreases.

b) Technique for Solving Positive-value-symmetrical-matrix Simultaneous Linear Equations In accordance with a technique for solving simultaneous linear equations expressed in terms of a positive-value symmetrical-matrix, the Cholesky factorization is applied only to a lower triangle matrix. In this case, a load of processing of small matrix blocks is cyclically distributed among processors in a distributed-memory parallel-processing computer. The load is distributed uniformly among the processors to solve the simultaneous linear equations. Much like the technique for solving simultaneous linear equations expressed in terms of a real matrix, a block width used in blocking can be set at a relatively small value to increase the efficiency of the parallel processing. Since an SMP computer displays high performance for a matrix product with a large block width obtained as a result of the update processing carried out at step 3 described above, it is necessary to increase the block size.

As described above, in the shared-memory scalar parallel-processing computer, a cost incurred in making an access to a shared memory employed in the computer is higher than a cost entailed in updating a matrix by using a matrix product through adoption of the LU factorization or the Cholesky factorization. Thus, if a method adopted in the conventional vector parallel-processing computer is applied to the shared-memory scalar parallel-processing computer as it is, sufficient performance of the shared-memory scalar parallel-processing computer cannot be displayed.

SUMMARY OF THE INVENTION

It is thus an object of the present invention addressing the problems described above to provide a parallel matrix processing method applicable to the shared-memory scalar parallel-processing computer.

A parallel matrix processing method applied to matrix processing carried out by a shared-memory scalar parallel-processing computer having a plurality of processor modules is characterized in that the parallel matrix processing method has:

a blocking step of dividing a matrix into small matrix blocks;

a storage step of storing diagonal blocks and small matrix sub-blocks of the small matrix blocks other than the diagonal blocks in local memories of the processor modules;

a processing step of redundantly processing the diagonal blocks in the processor modules by driving the processing modules to process their own small matrix blocks in parallel; and an updating step of updating the matrix with results of processing of the small matrix blocks obtained at the processing step.

In accordance with the present invention, a plurality of processor modules are capable of carrying out matrix processing with a high degree of efficiency by effectively

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is an explanatory diagram used for describing the LU factorization method of this embodiment in more detail (Part 5);

FIG. 10 is an explanatory diagram used for describing the LU factorization method of this embodiment in more detail (Part 6);

FIG. 11 is an explanatory diagram used for describing the concept of processing adopting the Cholesky factorization for a positive-value symmetrical matrix (Part 1);

FIG. 16 is an explanatory diagram used for describing the algorithm of the modified version of the Cholesky factorization in more detail (Part 3).

DESCRIPTION OF THE PREFERRED EMBODIMENTS

Figure 1:
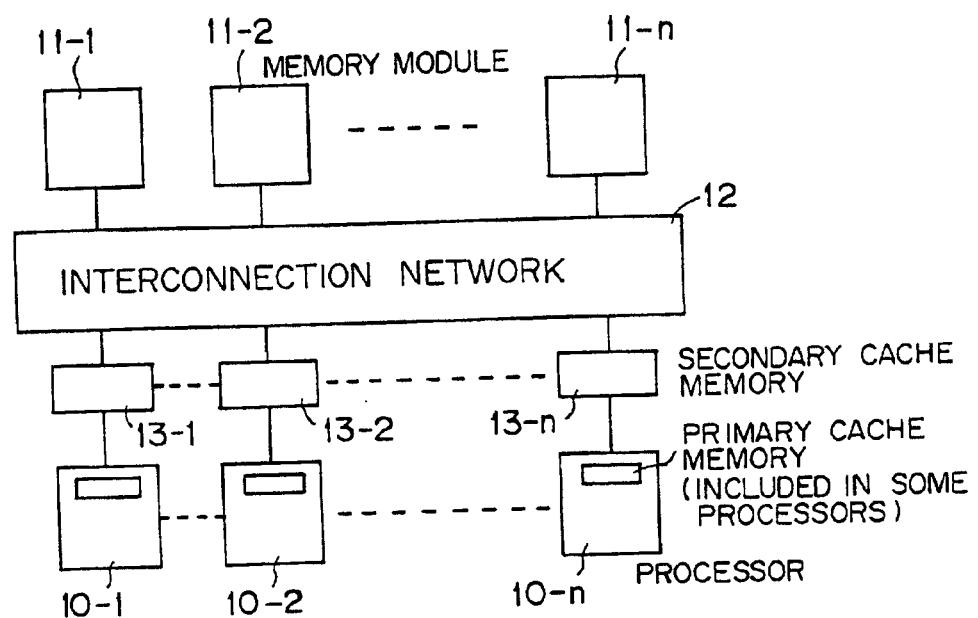
FIG. 1 is a diagram showing a typical hardware configuration of a shared-memory scalar parallel-processing computer.

FIG. 1 is a diagram showing a typical hardware configuration of a shared-memory scalar parallel-processing computer.

As shown in the figure, the shared-memory scalar parallel-processing computer has a plurality of processors 10-1, 10-2 ... 10-n which are connected to an interconnection network 12 through secondary cache memories 13-1, 13-2 ... 13-n. A primary cache memory is provided inside each of the processors 10-1, 10-2 ... 10-n or between each of the processors 10-1, 10-2 ... 10-n and the each of the secondary cache memories 13-1, 13-2 ... 13-n respectively. The processors 10-1, 10-2 ... 10-n share memory modules 11-1, 11-2 ... 11-n and are each capable of making an access to the memory modules 11-1, 11-2 ... 11-n through the interconnection network 12. In data processing carried out by any of the processors 10-1, 10-2 ... 10-n, first of all, data to be processed by the processor 10-j is transferred from any of the memory modules 11-1, 11-2 ... 11-n to one of the secondary cache memories 13-1, 13-2 ... 13-n associated with the processor 10-j. Then, a processing unit of the data is copied from the secondary cache memory 13-j to the primary cache memory inside the processor 10-j.

As a piece of processing is completed, a result of processing is transferred from the primary cache memory to the secondary cache memory 13-j where j=1 to n. When the entire processing of the data stored in the secondary cache memory 13-j is finished, the data is used for updating the original data stored in the memory module 11-j, from which the original data was transferred to the secondary cache memory 13-j.

In next data processing carried out by a processor 10-j, likewise, data to be processed by the processor 10-j is transferred from a memory module 11-j to a secondary cache memory 13-j associated with the processor 10-j. Then, a processing unit of the data is copied from the secondary cache memory 13-j to the primary cache memory inside the processor 10-j.

The processors 10-1, 10-2 ... 10-n carry out the processing repeatedly on data stored in a particular memory module 11-j in parallel. As described above, a processor 10-j stores results processing into a memory module 11-j to update original data and may read out the updated data for next processing. If the processor 10-j reads out the data from the memory module 11-j for the next processing with a timing of its own, it will be quite within the bounds of possibility that the processor 10-j reads out the pre-updating original data from the memory module 11-j instead of reading out the updated data. It is thus necessary to prevent a processor 10-j from reading out data from the memory module 11-j till all the processors 10-1, 10-2 ... 10-n complete the operations to update the data. The control to halt an operation carried out by a processor 10-j to read out data from a memory module 11-j in order to establish synchronization of processing among all the processors 10-1, 10-2 ... 10-n as described above is referred to as Barrier Synchronization.

Figure 2:
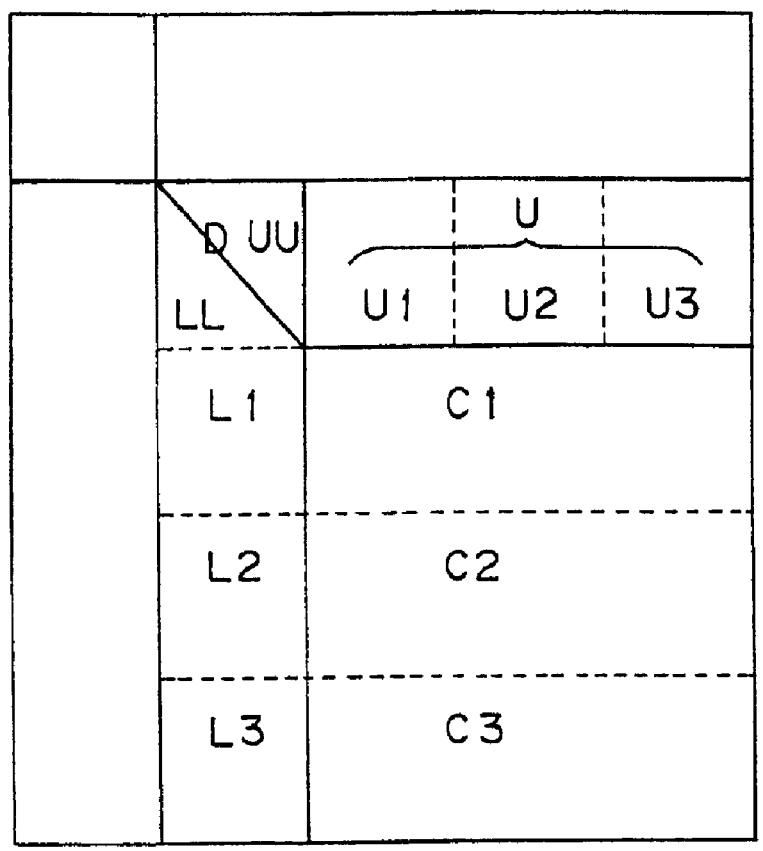
FIG. 2 is an explanatory diagram used for describing the concept of parallel processing adopting LU factorization in accordance with an embodiment of the invention (Part 1)
Figure 3:
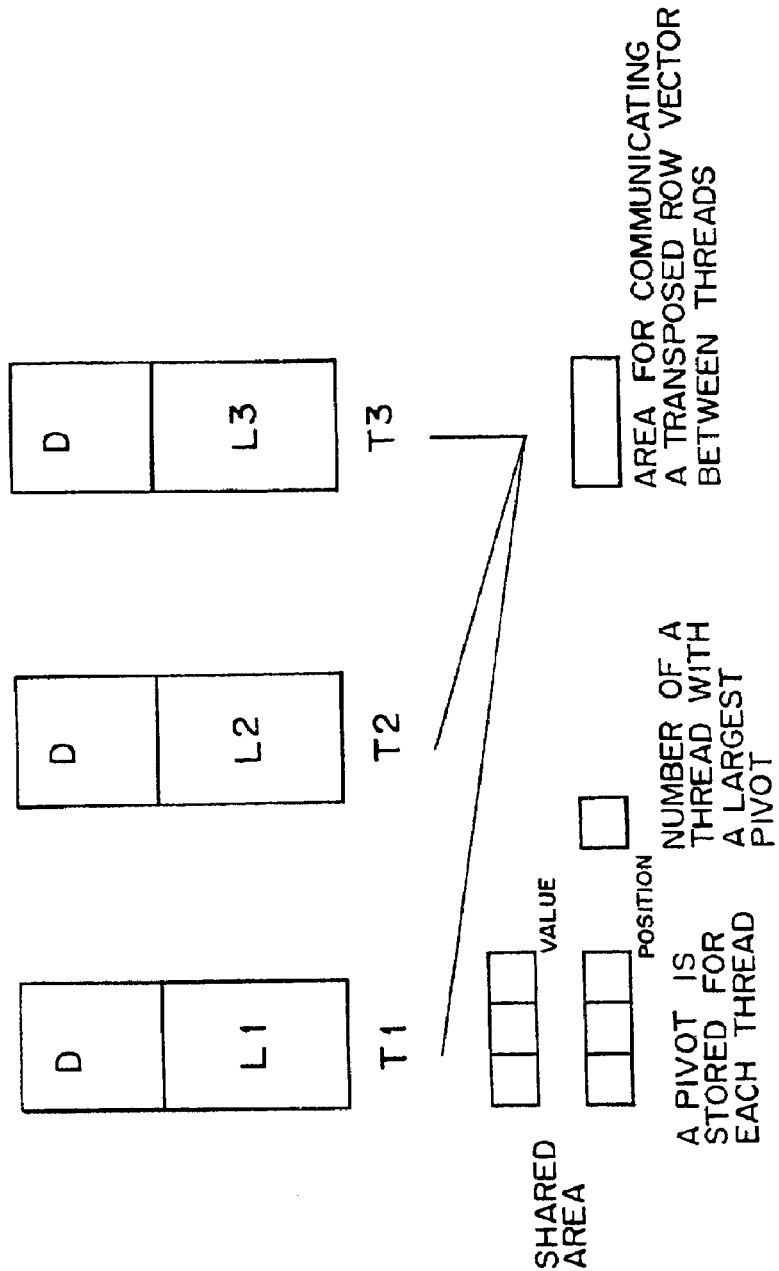
FIG. 3 is an explanatory diagram used for describing the concept of parallel processing adopting LU factorization in accordance with the embodiment of the invention (Part 2)

FIGS. 2 and 3 are diagrams showing the concept of LU-factorization parallel processing according to the embodiment of the present invention.

To be more specific, FIG. 2 shows a model of a matrix to be processed and FIG. 3 is an explanatory diagram showing the data structure of a processing unit.

a) Method of Solving Simultaneous Linear Equations Expressed in Terms of Real Matrixes in Accordance with the Embodiment This embodiment carries out parallel processing on portions obtained as a result of LU factorization with a larger width of each small matrix block to be processed by a processor than the conventional value. To put in detail, in accordance with the conventional method, portions L1 to L3 each have a small block width and are all processed by a processor (that is a PE or a thread) as shown in FIG. 2. In this embodiment, on the other hand, the block width is increased and the portions L1 to L3 are each assigned to a thread in parallel processing. It should be noted that, in this case, the number of threads is 3.

Each processor of a shared-memory scalar parallel-processing computer has primary and secondary cache memories independent of cache memories of other processors. Particularly, it is important to have high performance for computations in a range of data stored in the primary cache.

When solving a problem with a large amount of data by using a number of PEs, it is necessary to localize the data in each PE, carry out LU factorization in parallel on the data as a whole and secure as large a block width as possible.

For the reason described above, a secondary cache memory L is secured locally as a working area for each of the processors as shown in FIG. 3 and used for computation of data with an amount determined by the size of the cache memory L. At that time, a block diagonal portion D required for parallel updating is copied by each PE or each thread which then carries out a computation redundantly. In addition, when row vectors are transposed after taking a pivot in LU factorization, the PEs communicate with each other through a shared memory area provided in the secondary cache memory of one of the processors in order to share necessary data.

A value of the block width in the range b×(b+k)×8 to 8 Mbytes is used where the notation b denotes a block width and the notation k denotes the size of the first one dimension of a column block borne by each processor. By a block width, the width in the column direction of a small matrix is implied. Thus, the block width is the number of rows in a small matrix. In the case of the matrix shown in FIG. 2, the block width is the total number of rows in the blocks L1 to L3.

As for a portion copied to the working area, that is, the primary cache memory, LU factorization is carried out on data stored in the primary cache memory.

If the number of processors is small in comparison with the size of a memory occupied by a matrix to be processed or in comparison with the size of the matrix, the block size of a column block for parallel processing is reduced. In this case, after the block width is split and required blocks are secured, operations to update row blocks and matrix products are carried out in parallel.

LU factorization applied to working areas of processors or threads allows data stored in the cache memories to be used with a high degree of efficiency by adopting a method such as an inner-product method wherein the length of the inner product vector of updated portions is large or a method for carrying out LU factorization while displaying performance of the updated portion by recursively calling an algorithm.

Figure 4:
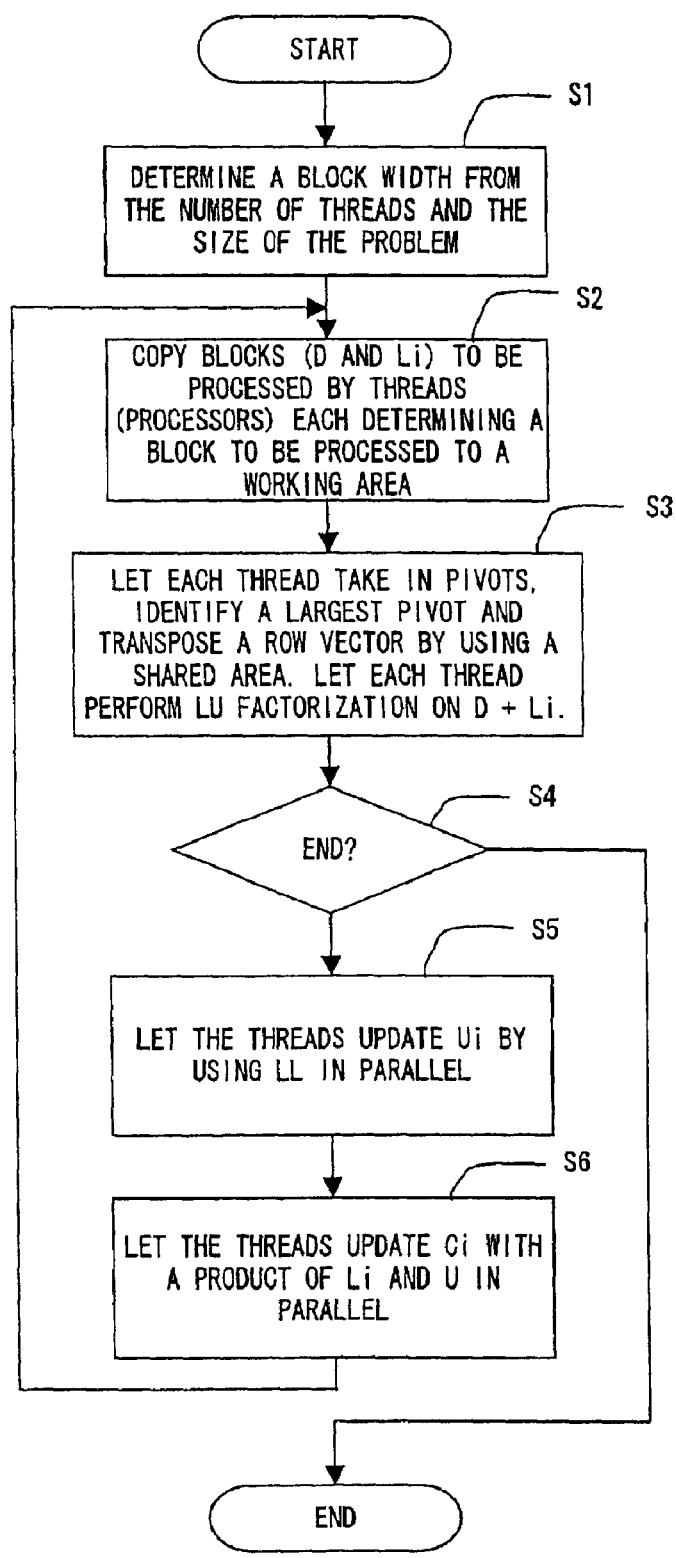
FIG. 4 is a flowchart showing a flow of processing of this embodiment's LU factorization in a plain and simple manner.

FIG. 4 is a flowchart representing the processing flow of LU factorization adopted by this embodiment in a simple and plain manner.

The flowchart begins with a step S1 at which a block width is determined from the number of threads and the magnitude of the problem, that is, the size of a matrix to be processed. Then, at the next step S2, a block to be processed by each of the threads is determined and copied to the working area of the thread. A block to be processed by a thread is denoted by a symbol D or Li in FIG. 2. Subsequently, at the next step S3, a pivot is determined by each thread. A pivot having a maximum value among the pivots is determined by using a shared area. Row vectors are then transposed by using the pivot showing the maximum value. The threads carry out LU factorization on the blocks D and Li.

The flow then goes on to a step S4 to determine whether the processing has been completed. If the processing has been completed, the processing is just ended. If the processing has not been completed, on the other hand, the flow goes on to a step S5 at which the threads update the blocks Ui shown in FIG. 2 with blocks LL shown in FIG. 2 in accordance with an LU-factorization algorithm. Then, at the next step S6, the threads update the blocks Ci shown in FIG. 2 with products of blocks Li and blocks U. The blocks U are each a combination of blocks Ui shown in FIG. 2. Then, the processing flow goes back to the step S2 to apply the LU factorization to the next blocks composed of Ci by adopting the same method. An unprocessed block with a gradually decreasing size eventually becomes only a portion corresponding to the block D. As the LU factorization is completed by one thread, the LU factorization of the whole matrix is ended.

FIGS. 5 to 10 are explanatory diagrams to be referred to in a detailed description of the LU-factorization method adopted in this embodiment.

The following description explains a case in which a 2,048×2,048 matrix is subjected to LU factorization by using 4 threads.

Figure 5:
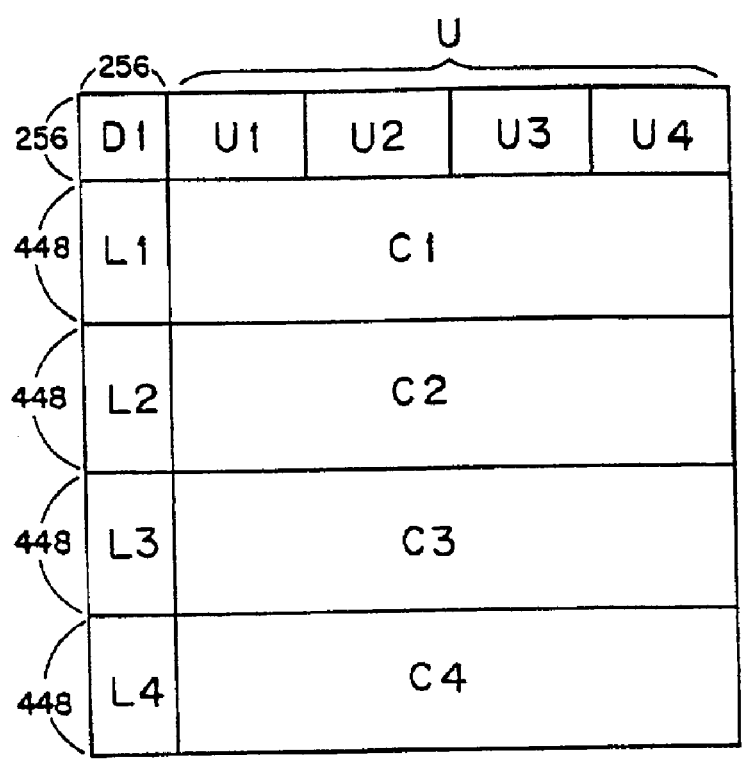
FIG. 5 is an explanatory diagram used for describing the LU factorization method of this embodiment in more detail (Part 1)
Figure 6:
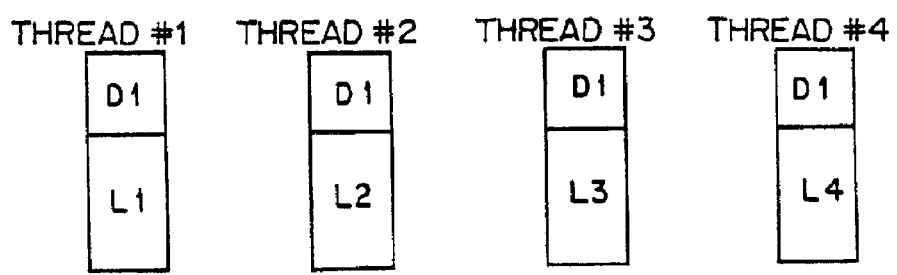
FIG. 6 is an explanatory diagram used for describing the LU factorization method of this embodiment in more detail (Part 2)

First of all, the 2,048×2,048 matrix is subjected to LU factorization to produce a block width of 256. Blocks obtained as a result of the LU factorization are shown in FIG. 5. In processing carried out by 4 CPUs (or the 4 threads), a contiguous area is allocated by each of the threads and D1+L1, D1+L2, D1+L3 and D1+L4 are copied to the contiguous areas allocated in the threads respectively as shown in FIG. 6. The size of each of the allocated contiguous areas is smaller than ((256+448)×256:8 MB (the size of the L2 cache memory)).

It should be noted that a block width is determined typically as follows.

$$\sqrt[3]{(n^3/\#\text{THREAD}) \times \frac{1}{100}} = nb$$

where the symbol n denotes the magnitude of the problem and the notation #THREAD denotes the number of threads. The magnitude of the problem is defined as (the size of the matrix:the degree of the matrix).

for nb≧512, the block width is 512;
for nb≧256, the block width is 256; and
for nb≧128, the block width is 128.

For other values of nb, the block width is 64. They are displayed as a menu allowing the user to select one of them.

That is, the cost of the LU factorization is $2n^3/3$ where the symbol n denotes the order of the matrix. Thus, a block width is set at such a value that the cost of the LU factorization is proportional to $n^3$. As a result, the total cost is borne by parallel processing with a thread count of #THREAD, and the 1% thereof is finally borne by one thread.

Figure 7:
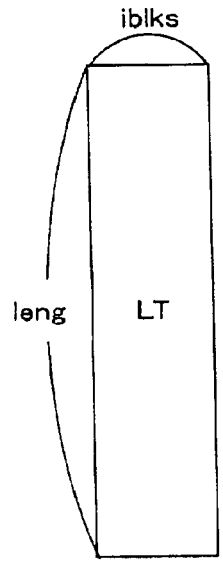
FIG. 7 is an explanatory diagram used for describing the LU factorization method of this embodiment in more detail (Part 3)

Here, in order to give the user better understanding, an algorithm of LU factorization with no parallel processing is shown in FIG. 7. FIG. 7 is a diagram showing an algorithm of the LU factorization applied to a portion LT=D1+L1+L2+L3+L4. Thus, the portion LT consists of 2048×256 blocks.

First of all, in an algorithm part (1), a pivot is determined. A notation iblks denotes the width of the portion LT. In this case, the width iblks is 256. A notation leng denotes the length of the portion LT. In this case, the length leng is 2,048. The number of a row with an existing pivot is set at a variable jj. The absolute value of the pivot is set at a variable TMP.

Then, in an algorithm part (2), if the number jj of a row with an existing pivot is greater than the number i on a column in the portion LT currently being processed, data of the ith row is transposed with data on the jjth row. Subsequently, in an algorithm part (3), the pivot of column i is used for carrying out processing of the LU factorization.

The algorithm parts (1) to (3) are executed repeatedly for i=1 to iblks.

If the length leng of the portion LT is large, these pieces of processing entail transposition of data stored in the cache memory L2, causing the performance to deteriorate substantially. In order to solve this problem, the data is distributed as shown in FIG. 5 and processing is carried out by holding the data in the cache memory L2 as it is. An algorithm adopted by each thread in this case is shown in FIG. 8.

Figure 8:
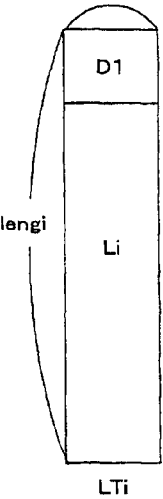
FIG. 8 is an explanatory diagram used for describing the LU factorization method of this embodiment in more detail (Part 4)

It should be noted that, in FIG. 8, a notation LTi denotes data stored in a local area whereas notations pivot (4), GPIVOT and ROW (iblks) each denote data stored in a shared area.

In an algorithm part (4), each thread takes a pivot. In an algorithm part (5), a maximum value is stored in elements of an array pivot (j) where j is the number of a thread. After the algorithm part (5), the barrier synchronization is established. In an algorithm part (6), the number of a thread having a maximum pivot among an array pivot (4) is stored in GPIVOT. After the algorithm part (6), the barrier synchronization is again established. In an algorithm part (7), the thread having the maximum pivot stores a row vector of the maximum pivot in a shared area ROW. After the algorithm part (7), the barrier synchronization is again established. In an algorithm part (8), if GPIVOT is 0, the maximum pivot is examined. If the maximum pivot is in D1, no transposition is required. Otherwise, transportation is carried out in a local area. If GPIVOT is equal to #THREAD, that is, if GPIVOT is greater than 0, threads that do not have the maximum pivot transpose the row vector of the ith row with contents of the shared area ROW. Then, in algorithm parts (9) and (10), processing of the LU factorization is carried out. The algorithm parts (4) to (10) are executed for all columns of a block being processed. That is, the processing is carried out for all values of i in the range 1 to iblks.

At the end of the LU factorization of LTi, the barrier synchronization is again established. Thereafter, a portion of D1 in each thread is subjected to LU factorization to produce LL and UU. Then, the threads carry out $U1 \leftarrow LL^{-1}U1$, $U2 \leftarrow LL^{-1}U2$, $U3 \leftarrow LL^{-1}U3$ and $U4 \leftarrow LL^{-1}U4$ computations in parallel. After the computations, D1, L1, L2, L3 and L4 are copied back from the local area to the matrix A and the barrier synchronization is again established. Then, the threads carry out $C1 \leftarrow C1-L1 \times U$, $C2 \leftarrow C2-L2 \times U$, $C3 \leftarrow C3-L3 \times U$ and $C4 \leftarrow C4-L4 \times U$ processing in parallel. Finally, the barrier synchronization is again established.

FIG. 9 is an explanatory diagram showing a state of a matrix after completion of 1-stage processing.

As shown in FIG. 9, by carrying out the processing described above, rows and columns on the outer sides of a matrix are processed. Thus, after that, the remaining portions on the left side of the bottom of the matrix are processed sequentially by adopting the same method. That is, a portion with a shrunk block width iblks is subjected to factorization in the same way to result in blocks D1, L1, L2, L3 and L4 as shown in FIG. 9. The resulting blocks are then copied to threads which carry out the same processing as what is described above. By carrying out the processing repeatedly as described above, a 256×256 block is finally left. This portion is subjected to LU factorization by one thread to complete the processing.

It should be noted that, in the LU factorization of LTi carried out in the processing described above, recursive LU factorization is implemented in order to utilize data stored in cache memories with a high degree of efficiency. In addition, in the $Ci \leftarrow Ci-Li \times U$ processing, the method to utilize data stored in cache memories with a high degree of efficiency is known as an already existing technology.

FIG. 10 is an explanatory diagram showing a recursive LU-factorization algorithm.

The recursive LU-factorization algorithm is implemented by an LU subroutine. Variables handled by the LU subroutine are LTi stored in D1+Li of each thread, k representing the size of a first one dimension of LTi, iblks representing a block width, ist showing a position to start LU factorization and nwid representing the width subjected to the LU factorization. The variables LTi, k and iblks are those used in the algorithm shown in FIG. 9.

First of all, at the beginning of the LU subroutine, nwid is compared with 8 to determine whether the width subjected to the LU factorization is 8. If YES indicating that the width subjected to the LU factorization is 8, LTi (ist:k, ist:ist+nwid−1) is subjected to LU factorization in parallel where the notation ist:k indicates that LTi with variables at locations indicated by ist to k and the notation ist:ist+nwid−1 indicates that LTi with variables at locations indicated by ist to ist+nwid−1. The notations have the same meaning in the following description.

In the LU factorization of LTi, processing of the algorithm parts (4) to (10) shown in FIG. 9 is carried out. In this case, however, the transposed portion is LTi (i, 1: iblks) with a length of iblks.

If the result of the determination is NO, on the other hand, the LU subroutine is called recursively by setting the width nwid subjected to the LU factorization at nwid/2. Then, a TRS subroutine is called. This TRS subroutine updates LTi (ist:ist+nwid/2−1, ist+nwid/2: ist+nwid). Furthermore, by using a lower-triangular matrix LL of LTi (ist: ist+nwid/2−1, ist: ist+nwid/2−1), an updating operation through application of Ci to $LL^{-1}$ from the left. Next, an MM subroutine is called. The MM subroutine carries out the following processing:

LTi (ist+nwid/2: k, ist+nwid/2: ist+nwid)=LTi (ist+nwid/2: k, ist+nwid/2: ist+nwid)−LTi (ist+nwid/2: k, ist:ist+nwid/2−1)×LTi (ist:ist+nwid/2−1, ist+nwid/2: ist+nwid)

Figure 12:
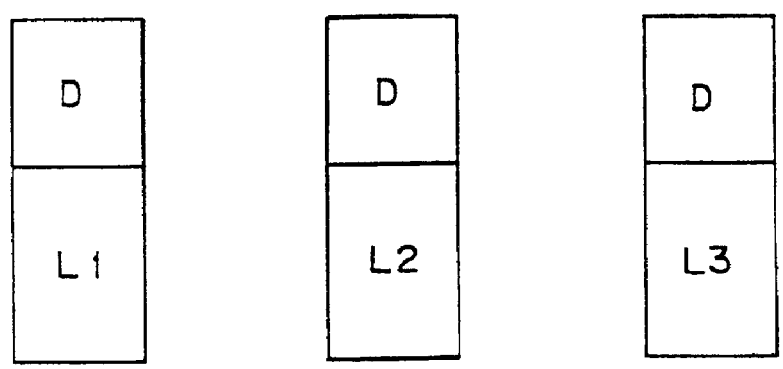
FIG. 12 is an explanatory diagram used for describing the concept of processing adopting the Cholesky factorization for a positive-value symmetrical matrix (Part 2)
Figure 13:
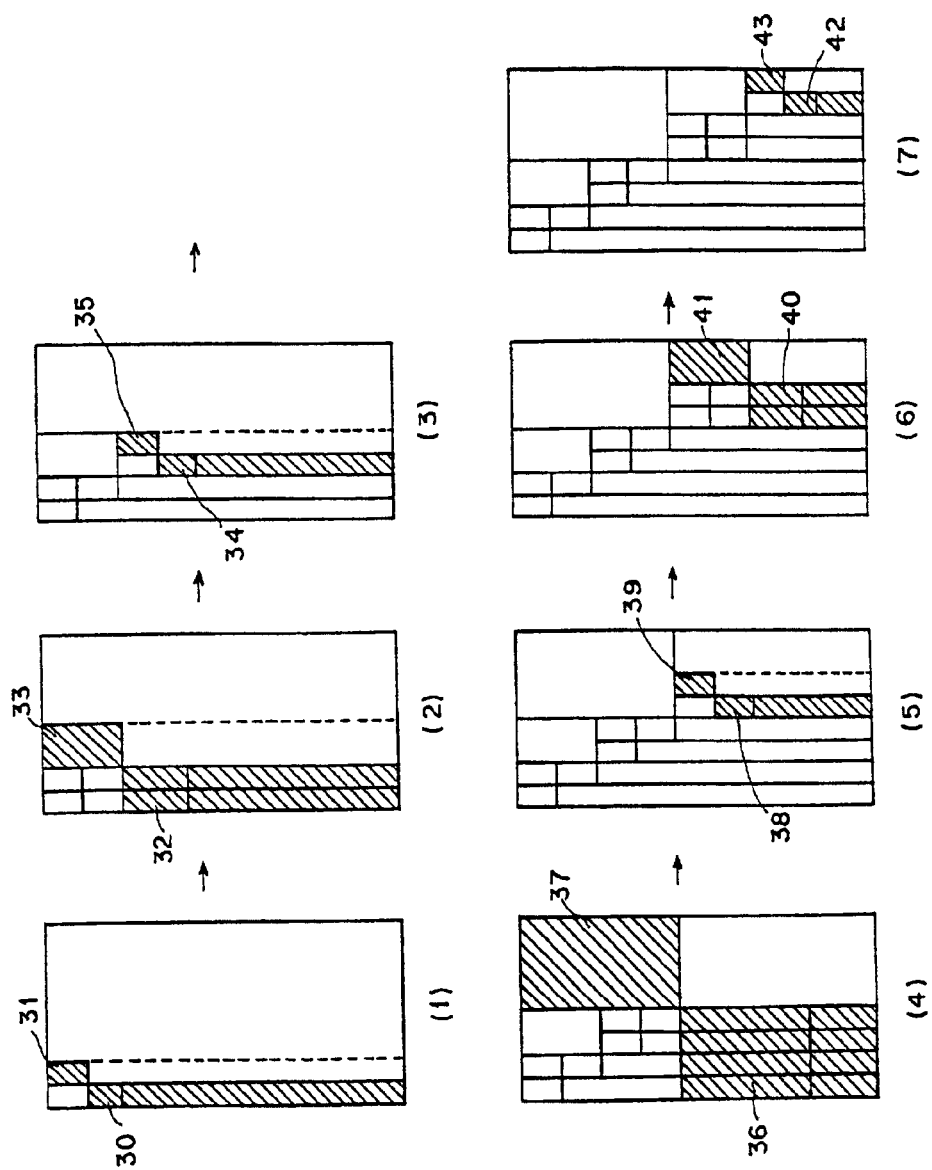
FIG. 13 is an explanatory diagram used for describing the concept of processing adopting the Cholesky factorization for a positive-value symmetrical matrix (Part 3)

Afterward, the barrier synchronization is established. Then, the LU subroutine is recursively called. At the end of the processing, the processing is terminated. Control is finally executed to exit from the LU subroutine.

b) Solving Simultaneous Linear Equations Expressed by a Positive-value Symmetrical Matrix FIGS. 11 to 13 are explanatory diagrams showing the concept of processing of the Cholesky factorization on a positive-value symmetrical matrix.

Much like a real matrix used in the expression of simultaneous linear equations, the positive-value symmetrical matrix is split into a diagonal matrix D and column block portions L1, L2 and L3. Each thread copies the diagonal matrix D as well as the column block portions L1, L2 and L3 into a working area as shown in FIG. 12 and applies the Cholesky factorization to the diagonal matrix D as well as the column block portions L1, L2 and L3 independently of other threads and concurrently with the other threads. It should be noted that, in this case, it is not necessary to take a pivot. Small lower-triangular matrixes C1 to C6 are updated by using these column block portions. In order to distribute the processing load in the parallel updating operations, the small lower-triangular matrixes C1 to C6 to be updated are formed into pairs having the same block width of 2×#T where the notation #T denotes the number of threads. To put it concretely, C1 is paired with C6, C2 is paired with C5 and C3 is paired with C4. In this way, each thread updates the ith block and the (2×#T+1−i)th blocks in a uniform distribution of the processing load where i=1 to #T.

Since the matrix being considered is a positive-value symmetrical matrix, a portion corresponding to U shown in FIG. 2 is a result of transposition LT of a column block consisting of L1+L2+L3. Thus, in this case, the $L^T$ portion is obtained by transposing and copying each of L1, L2 and L3 without the need to carry out processing.

FIG. 13 is explanatory diagrams showing a progress state of recursive Cholesky factorization.

At a first step, as shown in a diagram (1), a leftmost block of the matrix is subjected to the Cholesky factorization and a part of a hatched portion 30 is copied to a hatched part of a portion 31. Then, a part of the portion 31 under a dashed line is updated with the hatched portion 30. At a second step, as shown in a diagram (2), the width of a processed column is doubled and a part of a hatched portion 32 is copied to a hatched part of a portion 33. Then, a part of the portion 33 under a dashed line is updated with the hatched portion 32. At a third step, as shown in a diagram (3), a part of a hatched portion 34 is copied to a hatched part of a portion 35. Then, a part of the portion 35 under a dashed line is updated with the hatched portion 34. At a fourth step, as shown in a diagram (4), a part of a hatched portion 36 is copied to a hatched part of a portion 37. Then, a lower part of the portion 37 is updated with the hatched portion 36. At a fifth step, as shown in a diagram (5), a part of a hatched portion 38 is copied to a hatched part of a portion 39. Then, a part of the portion 39 under a dashed line is updated with the hatched portion 38. At a sixth step, as shown in a diagram (6), a part of a hatched portion 40 is copied to a hatched part of a portion 41. Then, a part of the portion 41 under a dashed line is updated with the hatched portion 40. At a seventh step, as shown in a diagram (7), a part of a hatched portion 42 is copied to a hatched part of a portion 43. Then, a lower part of the portion 43 is updated with the hatched portion 42.

In this way, the Cholesky factorization is applied to portions of a matrix repeatedly and, finally, the Cholesky factorization is applied to the entire matrix.

Figure 14:
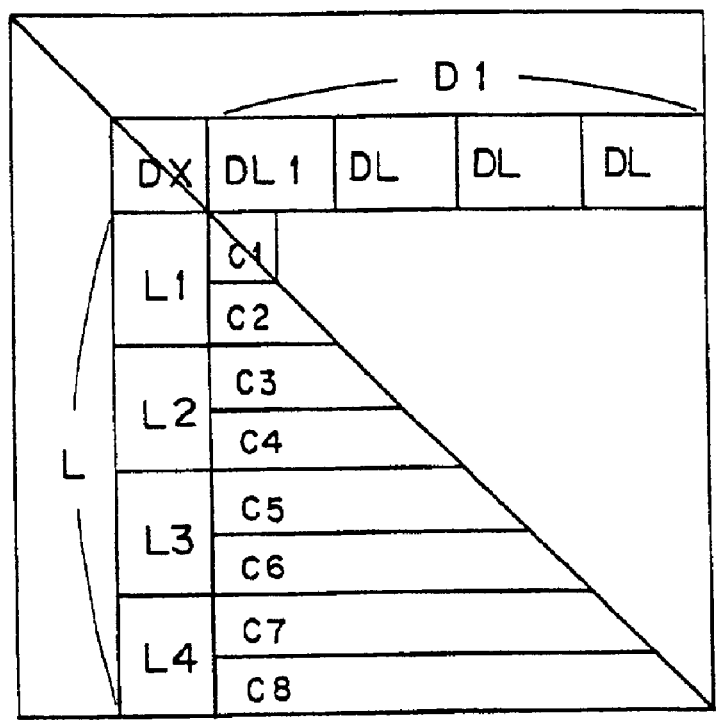
FIG. 14 is an explanatory diagram used for describing an algorithm of a modified version of the Cholesky factorization in more detail (Part 1)
Figure 15:
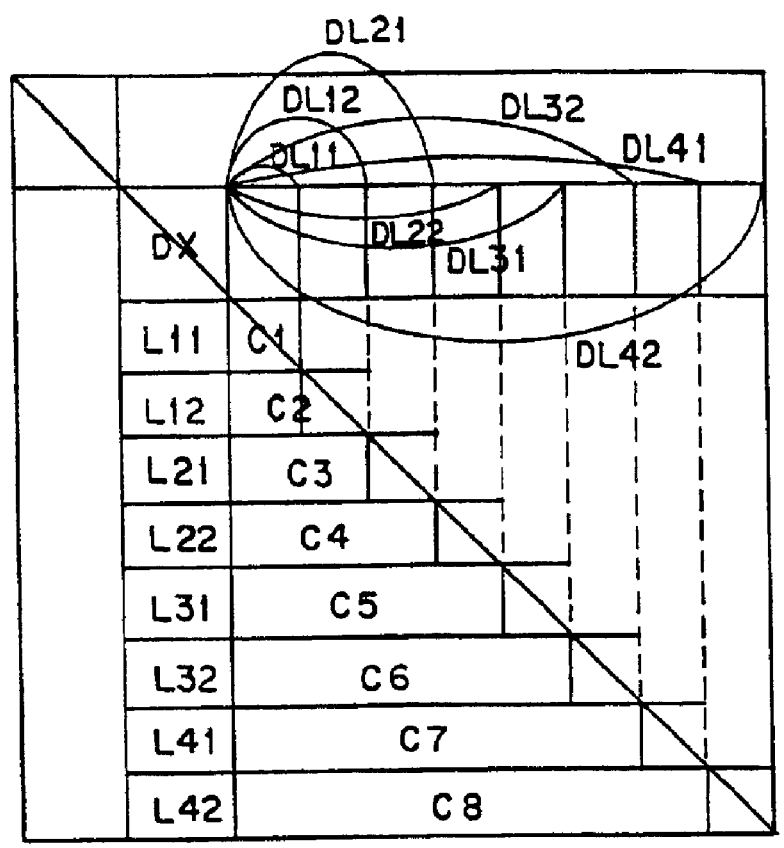
FIG. 15 is an explanatory diagram used for describing the algorithm of the modified version of the Cholesky factorization in more detail (Part 2)

FIGS. 14 to 16 are explanatory diagrams used for describing an algorithm of a modified version of the Cholesky factorization in more detail.

In order to make the explanation simple, processing carried out by 4 threads is assumed.

First of all, each of the threads copies Dx and Li, which are shown in FIG. 14, to a contiguous area LTi. Then, the area LTi is subjected to $LDL^T$ factorization. The $LDL^T$ factorization is carried out by adopting a recursive technique. Then, values are copied in the following parallel processing to DLi.

$DLi \leftarrow D \times Li^T$, where the notation D denotes diagonal elements of Dx and the right side is a local area of each thread.

Then, Dx (from the first thread) and other Li are copied back to their original areas in parallel processing. After the copy processing, the barrier synchronization is established. As shown in FIG. 15, a pair of C1 and C8, a pair of C2 and C7, a pair of C3 and C6 and a pair of C4 and C5 are updated in parallel processing by the 4 threads respectively. That is, in the first thread:
C1←C1−L11×DL11
C8←C8−L42×DL42 in the second thread:
C2←C2−L12×DL12
C7←C7−L41×DL41 in the third thread:
C3←C3−L21×DL21
C6←C6−L32×DL32 in the fourth thread:
C4←C4−L22×DL22
C5←C5−L31×DL31

At the point the processing is ended, the barrier synchronization is established. For the area of a matrix with a smaller circumference, the same processing is carried out. The processing described above is carried out repeatedly. Finally, one thread carries out $LDL^T$ factorization to end the processing.

The processing carried out by the threads to update Ci as described above is explained in terms of general words as follows. L is split into 2×#THREAD portions and, similarly, the lower-triangular portion of C is also divided into 2×#THREAD portions where the symbol #THREAD denotes the number of threads. Then, #THREAD pairs are created from upper and lower portions, and the portions obtained as a result of division of C are updated with these pairs.

FIG. 16 is a diagram showing a recursive algorithm of the $LDL^T$ factorization.

The algorithm of the $LDL^T$ factorization is implemented as an LDL subroutine. Variables of the LDL subroutine are the same as the LU factorization described earlier.

First of all, if nwid is equal to 8, the $LDL^T$ factorization is directly carried out in an algorithm part (20). Then, LTi (ist+8:k, ist: ist+7) is updated. In this case, since the upper-triangular portion of LTi (ist:ist+7, ist:ist+7) includes DLT, (DLT)−1 is updated from the right.

If the first IF statement in the algorithm part (20) is denied, that is, if nwid is not equal to 8, on the other hand, the LDL subroutine is again called by substituting nwid/2 for nwid as an argument. Here, $DL^T$ is copied to LTi (ist:ist+nwid/2−1, ist+nwid/2: ist+nwid−1). D is a diagonal element of LTi (ist:ist+nwid/2−1, ist:ist+nwid/2−1) and L is LTi (ist+nwid/2: ist+nwid−1, ist:ist+nwid/2−1). This L is transposed.

Then, LTi (ist+nwid/2: k, ist+nwid/2: ist−nwid−1) is updated. That is, the following processing is carried out:
LTi (ist+nwid/2: k, ist+nwid/2: ist+nwid−1)=LTi (ist+nwid/2: k, ist+nwid/2: ist+nwid−1)−LTi (ist+nwid/2: k, ist:ist+nwid−1)×LTi (ist:ist+nwid/2−1, ist+nwid/2: ist+nwid−1)

Next, the LDL subroutine of the $LDL^T$ factorization is recursively called. Then, as the processing is ended, control is executed to exit from the subroutine.

It should be noted that, since the embodiments of the present invention are each given as an algorithm of a shared-memory scalar parallel-processing computer as is obvious from the description, the algorithms can each be implemented by a program. As an alternative, if the shared-memory scalar parallel-processing computer is used as an LU-factorization special-purpose machine or a Cholesky-factorization special-purpose machine, the program can be stored in a ROM in advance. If the shared-memory scalar parallel-processing computer is used as a general-purpose computer, on the other hand, there is conceived an implementation wherein the algorithms provided by the embodiments of the present invention are each recorded in a portable recording medium such as a CD-ROM or a stationary recording medium such as a hard disc in advance as a program and, when required, the program can be loaded into a processor.

In such a case, programs each implementing an algorithm provided by the embodiments of the present invention can be distributed to users by using the portable recording media.

(Reference)

The LU factorization is described in references (1) and (2) whereas the modified Cholesky factorization is described in reference (1).

1) P. Amestoy, M. Dayde and I. Duff, "Use of Computational Kernels in the Solution of full and Sparse Linear Equations."

M. Cosnard, Y. Roberts, Q. Quinton and M. Raynal, "Parallel & Distributed Algorithms," North-Holland, 1989, pages 13 to 19.

2) G. H. Golub and C. F. van Loan, "Matrix Computations," second edition, the Johns Hopkins University Press, 1989.

The following references describe the LU factorization and the $LDL^T$ factorization in the Japanese language.

"Numerical Analyses," authored by Masatake Mori and published by Kyoritsu Shuppan.

"Super Computers and Programming," authored by Masaaki Shimazaki and published by Kyoritsu Shuppan In accordance with the present invention, it is possible to provide a method of processing matrixes at high performance and with a high degree of scalability.

While the invention has been described with reference to the preferred embodiments thereof, various modifications and changes may be made to those skilled in the art without departing from the true spirit and scope of the invention as defined by the claims thereof.

What is claimed is:

1. A recording medium for storing a program executable by an information apparatus for implementing a parallel matrix processing method in matrix processing, which includes LU factorization, and is carried out by a shared-memory scalar parallel-processing computer having a plurality of processor modules, secondary caches corresponding respectively to the processor modules, primary caches respectively included in the processor modules, an interconnection network connecting the processor modules via the secondary caches, and a plurality of memory modules which the processor modules can access via the interconnection network, said method comprising:

dividing a matrix into small matrix blocks consisting of a diagonal block defined to align along the diagonal part, a block that is long in the row direction and positioned contiguously to the diagonal block, a block that is long in the column direction and positioned contiguously to the diagonal block and a square block;

storing the diagonal blocks and small matrix blocks obtained by equally dividing the block that is long in the column direction and positioned contiguously below the diagonal block in local memories of said processor modules;

processing, in parallel by said processor modules, the blocks stored respectively in the local memories of said processing modules together with the diagonal block and the block that is long in the row direction or column direction so as to be the same with the calculation results of corresponding block carts when a square matrix is LU factorized; and updating the square block by deducting from the square block the products between the block that is long in the row direction and the block that is long in the column direction using results of processing of said small matrix blocks obtained at said processing step.

2. A recording medium according to claim 1, said method further comprising:

extracting pivot candidates, each of which represents a matrix element associated with the largest value of the concerned matrix, from data of said small matrix blocks processed by said processor modules; and determining a final one of said pivots with a maximum data value among said candidates in a memory area common to said processor modules, and wherein said LU factorization is carried out by using said determined pivot.

3. A recording medium according to claim 1 herein said LU factorization of said entire matrix is completed by execution of the method comprising:

sequentially updating portions of said matrix starting with one on the outer side of said matrix in accordance with a recursive algorithm; and eventually applying said LU factorization by using one processor module to a portion that remains to be updated inside said matrix.

4. A recording medium according to claim 1 wherein said matrix processing is Cholesky factorization or a modified version of said Cholesky factorization applied to said matrix.

5. A recording medium according to claim 4 wherein said Cholesky factorization or said modified version of said Cholesky factorization is carried out to complete said LU factorization of said entire matrix by execution of the method comprising:

sequentially updating portions of said matrix starting with one on the outer side of said matrix in accordance with a recursive algorithm; and eventually applying said LU factorization by using one processor module to a portion that remains to be updated inside said matrix.

6. A recording medium according to claim 4 wherein, at said updating step, a triangular matrix portion of each of said small matrix block to be updated is divided into 2×N fine blocks wherein the symbol N denotes the number of processor modules; and said fine blocks are assembled to form N pairs each stored in a local memory area of one of said processor modules to be processed by said processor module.

7. A parallel matrix processing method applied to matrix processing, which includes LU factorization, and is carried out by a shared-memory scalar parallel-processing computer having a plurality of processor modules, secondary caches corresponding respectively to the processor modules, primary caches respectively included in the processor modules, an interconnection network connecting the processor modules via the secondary caches, and a plurality of memory modules which the processor modules can access via the interconnection network, said parallel matrix processing method comprising:

dividing a matrix into small matrix blocks consisting of a diagonal block defined to align along the diagonal part, a block that is long in the row direction and positioned contiguously to the diagonal block, a block that is long in the column direction and positioned contiguously to the diagonal block and a square block;

storing the diagonal blocks and small matrix blocks obtained by equally dividing the block that is long in the column direction and positioned contiguously below the diagonal block in local memories of said processor modules;

processing, in parallel by said processor modules, the blocks stores respectively in the local memories of said processing modules together with the diagonal block and the block that is long in the row direction or column direction so as to be the same with the calculation results of corresponding block parts when a square matrix is LU factorized; and updating the square block by deducting from the square block the products between the block that is long in the row direction and the block that is long in the column direction using results of processing of said small matrix blocks obtained at said processing step.

8. A shared-memory scalar parallel-processing computer having a plurality of processor modules, said shared-memory scalar parallel-processing computer comprising:

a blocking unit dividing a matrix into small matrix blocks consisting of a diagonal block defined to align along the diagonal part, a block that is long the row direction and positioned contiguously to the diagonal block, a block that is long in the column direction and positioned contiguously to the diagonal block and a square block;

a storage unit storing diagonal blocks and small matrix blocks obtained by equally dividing the block that is long in the column direction and positioned contiguously below the diagonal block in local memories of said processor modules;

a processing unit in parallel by said processor modules, the blocks stores respectively in the local memories of said processing modules together with the diagonal block and the block that is long in the row direction or column direction so as to be the same with the calculation results of corresponding block parts when a square matrix is LU factorized; and an updating unit updating the square block by deducting from the square block the products between the block that is long in the row direction and the block that is long in the column direction using results of processing of said small matrix blocks produced by said processing means.

* * * * *

UNITED STATES PATENT AND TRADEMARK OFFICE
CERTIFICATE OF CORRECTION

PATENT NO. : 6,907,513 B2  
DATED : June 14, 2005  
INVENTOR(S) : Makoto Nakanishi It is certified that error appears in the above-identified patent and that said Letters Patent is hereby corrected as shown below:

Column 11,  
Line 61, after "block" delete "carts" and insert -- parts --.

Column 12,  
Line 12, delete "herein" and insert -- wherein --.

Column 13,  
Line 18, after "long" insert -- in --.

Signed and Sealed this

Twenty-eighth Day of March, 2006

JON W. DUDAS  
*Director of the United States Patent and Trademark Office*